US011798248B1

(12) United States Patent
Shchurko et al.

(10) Patent No.: US 11,798,248 B1
(45) Date of Patent: Oct. 24, 2023

(54) FITTING VIRTUAL EYEWEAR MODELS ON FACE MODELS

(71) Applicant: Amazon Technologies, Inc., Seattle, WA (US)

(72) Inventors: Aliaksandr Shchurko, San Jose, CA (US); Xing Zhang, Santa Clara, CA (US); Anandram Sundar, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/573,347

(22) Filed: Jan. 11, 2022

(51) Int. Cl.
| | |
|---|---|
| *G06T 19/20* | (2011.01) |
| *G06T 19/00* | (2011.01) |
| *G06T 17/20* | (2006.01) |
| *G06Q 30/0601* | (2023.01) |
| *G06V 40/16* | (2022.01) |
| *G06V 20/20* | (2022.01) |

(52) U.S. Cl.
CPC ......... *G06T 19/20* (2013.01); *G06Q 30/0621* (2013.01); *G06Q 30/0643* (2013.01); *G06T 17/20* (2013.01); *G06T 19/006* (2013.01); *G06V 20/20* (2022.01); *G06V 40/165* (2022.01); *G06T 2210/21* (2013.01); *G06T 2219/2004* (2013.01)

(58) Field of Classification Search
CPC ................... G06T 2210/21; G06T 2219/2004
See application file for complete search history.

(56) References Cited

U.S. PATENT DOCUMENTS

| | | | |
|---|---|---|---|
| 11,553,969 B1 * | 1/2023 | Lang | G02B 27/0172 |
| 2013/0088490 A1 * | 4/2013 | Rasmussen | G06T 17/00 |
| | | | 345/421 |
| 2020/0160556 A1 * | 5/2020 | Cook | G02C 13/003 |
| 2021/0088811 A1 * | 3/2021 | Varady | G06V 40/171 |

* cited by examiner

*Primary Examiner* — Samantha (Yuehan) Wang
(74) *Attorney, Agent, or Firm* — K&L Gates LLP

(57) ABSTRACT

A system and method for fitting virtual eyewear models on face models is described herein. The method includes attaching a first collider to a model of eyewear and attaching a second collider to a model of a user's face. The method also includes positioning the model of eyewear onto the model of the user's face by reducing a distance between the model of eyewear and the model of the user's face until the first collider attached to the model of eyewear collides with the second collider attached to the model of the user's face and anchoring the model of eyewear to the model of the user's face.

17 Claims, 10 Drawing Sheets

FITTING VIRTUAL EYEWEAR MODELS ON FACE MODELS

BACKGROUND

The present disclosure relates to eyewear (e.g., glasses, sunglasses, etc.), and more specifically, to fitting eyewear on a person's face. One challenge of purchasing eyewear online is that a user may not have the opportunity test the eyewear on the user's face before purchasing, and thus, it may be difficult to find eyewear that is a good fit on the user's face. Some eyewear services attempt to simulate the fit on the user's face prior to purchasing by superimposing an image of the eyewear onto an image of the user's face, but in many instances, this process results in portions of the eyewear floating off the user's face or sinking into the user's face, which is not an accurate depiction of the actual fit on the user's face.

DETAILED DESCRIPTION

This disclosure describes a system that uses a collision detection algorithm to simulate an accurate and realistic fit of eyewear on a user's face, in particular embodiments. When a user who is shopping for eyewear online selects a piece of eyewear to try, the system retrieves a model of the eyewear. The user then uses a camera (e.g., a phone camera) to capture an image or video of the user's face and to convert that image or video into a model of the user's face. The system then attaches colliders to the model of the eyewear and to the model of the user's face. The colliders are three-dimensional kinematic objects (e.g., kinematic cubes) that can detect collisions with each other. The system then gradually moves the model of the eyewear towards the model of the user's face until a collider on the model of the eyewear collides with a collider on the model of the user's face. The system then anchors the model of the eyewear to the model of the user's face. In this manner, the system simulates how the eyewear will rest on the contours of the user's face, in certain embodiments.

Figure 1:
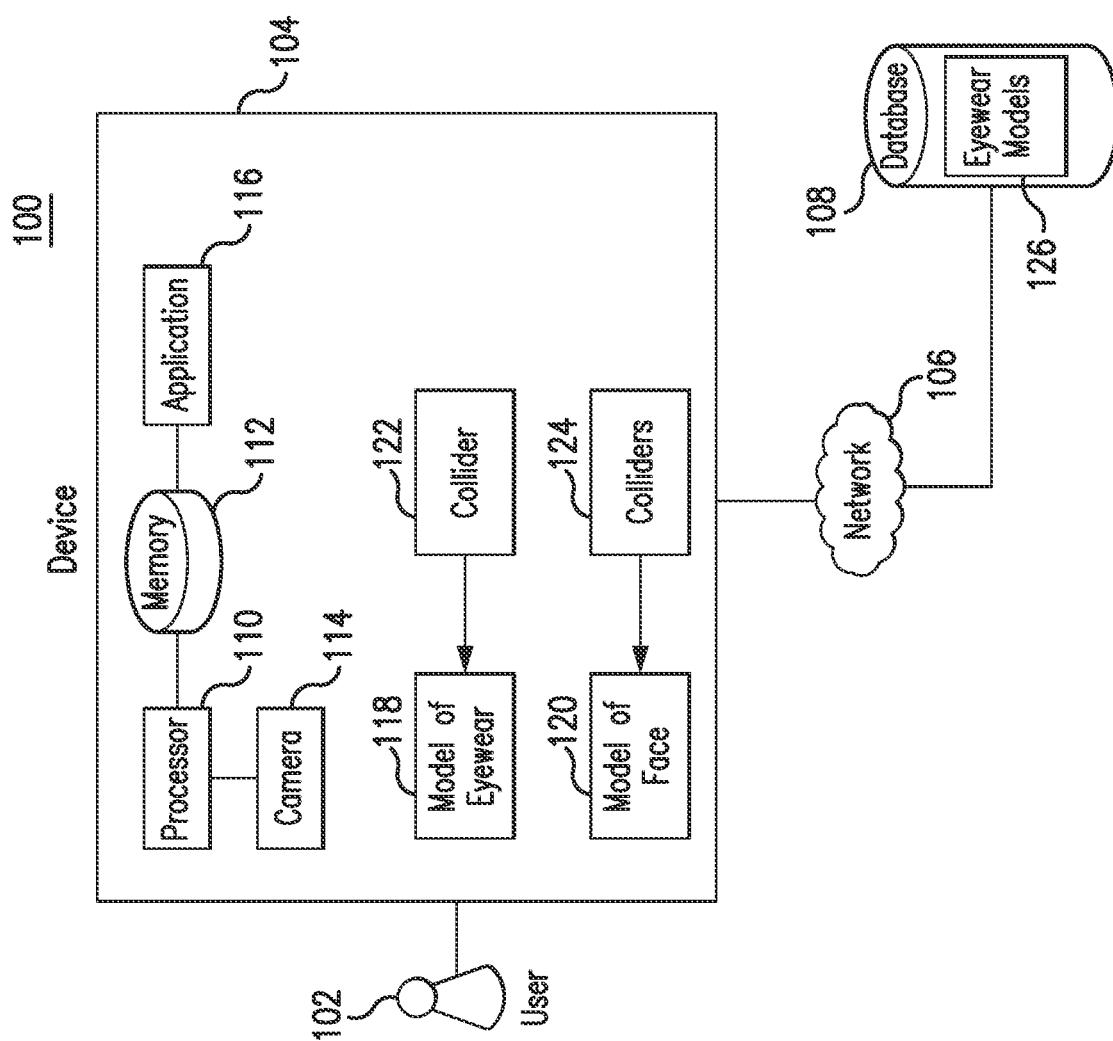
FIG. 1 illustrates an example system.

FIG. 1 illustrates an example system 100. As seen in FIG. 1, the system 100 includes a device 104, a network 106, and a database 108. The system 100 allows a user 102 to purchase eyewear online. The system 100 processes a three-dimensional model of the eyewear and a three-dimensional model of the user's 102 face to simulate a fit of the eyewear on the user's 102 face. In particular embodiments, the system 100 provides a more realistic and accurate simulation of the eyewear on the user's 102 face relative to other processes that superimpose images of the eyewear on images of the user's 102 face.

The user 102 uses the device 104 to make an online purchase of eyewear. The user 102 may also use the device 104 to simulate the fitting of the eyewear on the user's 102 face. As seen in FIG. 1, the device 104 includes a processor 110, a memory 112, and a camera 114, which perform the actions and functions of the device 104 described herein. For example, the memory 112 may store an application 116 that is executed by the processor 110. Additionally, when executed, the application 116 may use the camera 114 to capture an image or video of the user's 102 face.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the network 106, database 108, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The camera 114 may be any suitable device that captures images or video. The user 102 may use the camera 114 to capture images or video of the user's 102 face. One or more applications 116 executing on the device 104 may then generate a three-dimensional model (e.g., a mesh model) of the user's 102 face using the image or video captured by the camera 114. The device 104 may then use the model of the user's 102 face to simulate a fit of eyewear on the user's 102 face.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 stores eyewear models 126. The eyewear models 126 may be three-dimensional models of eyewear that the user 102 may select for purchase or for simulation of a fit. When the user 102 uses the device 104 to select eyewear that the user 102 desires to purchase, the device 104 may retrieve a three-dimensional model of that eyewear from the database 108. For example, the device 104 may query the database 108 using a name or other identifier for the selected eyewear. The database 108 then returns a three-dimensional model of the selected eyewear to the device 104. The device 104 may then use that model to simulate a fit of the eyewear on the user's 102 face.

In operation, the user 102 uses the device 104 to peruse through an online catalog of eyewear. The user 102 may see eyewear that the user 102 desires to purchase and select that eyewear. The device 104 retrieves from the database 108 a model 118 of the selected eyewear (e.g., a three-dimensional model of the selected eyewear).

The device 104 uses the camera 114 to capture images or video of the user's 102 face. One or more applications 116 executing on the device 104 then generate a model 120 of the user's 102 face using the images or video captured by the camera 114. In some embodiments, the model 120 of the user's 102 face is a three-dimensional mesh model. The mesh model may include vertices that define the surface or contours of the user's 102 face. For example, the vertices in the mesh model may be positioned at ridges, bumps, or other locations on the face where the surface of the face changes shape or direction. Edges connect the vertices to each other to form the mesh model.

The device 104 then uses the model 118 of eyewear and the model 120 of the user's 102 face to simulate a fit of the selected eyewear on the user's 102 face. In some embodiments, the device 104 attaches one or more colliders 122 to the model 118 of eyewear and colliders 124 to the model 120 of the user's face. The colliders 122 and 124 are three-dimensional, virtual, kinematic objects that are used to detect collisions between different virtual objects. For example, the colliders 122 and 124 may be kinematic cubes that attach to various surfaces in the model 118 of eyewear and the model 120 of the user's 102 face. The colliders 122 and 124 may be rigid or inelastic virtual objects that do not change shape when colliding with other objects in the virtual space. The colliders 122 and 124 may be any suitable size or shape that occupies volume in the virtual space. For example, the colliders 122 and 124 may be cubes, boxes, spheres, tubes, or cylinders. Additionally, the device 104 may add any suitable number of colliders 122 and 124 to the models 118 and 120.

The colliders 122 may be attached to a position on the boundary of the model 118 of eyewear. For example, the collider 122 may be positioned on a rim or a nose-pad of the model 118 of eyewear. In some embodiments, the device 104 attaches multiple colliders 122 on the boundary of the model 118 of eyewear. In other embodiments, the device 104 attaches one collider 122 that conforms to the shape or boundary of the model 118 of eyewear.

The device 104 attaches multiple colliders 124 to the model 120 of the user's 102 face. If the model 120 of the user's face is a three-dimensional mesh model, the device 104 attaches colliders 124 to various vertices in the mesh model. In some embodiments, the device 104 attaches colliders 124 to only a portion of the vertices in the mesh model. The device 104 implements certain rules or thresholds to exclude various vertices in the mesh model from being attached to a collider 124. In this manner, the device 104 reduces the number of colliders 124 attached to the model 120 of the user's 102 face, which reduces (i) the amount of processing resources used to detect a collision between the collider 122 and the colliders 124 and (ii) the amount of time it takes to simulate the fit of the eyewear on the user's 102 face.

After the collider 122 is attached to the model 118 of eyewear and the colliders 124 are attached to the model 120 of the user's 102 face, the device 104 begins to simulate the fit of the eyewear on the user's 102 face. The device 104 may begin by positioning the model 118 of eyewear relative to the model 120 of the user's 102 face (e.g., at a midpoint between the eyes on the model 120 of the user's 102 face). The device 104 then gradually moves the model 118 of eyewear towards the model 120 of the user's face until the collider 122 on the model 118 of eyewear collides with a collider 124 on the model 120 of the user's 102 face. After the device 104 has detected the collision between the collider 122 and the colliders 124, the device 104 anchors the model 118 of eyewear to the model 120 of the user's face. As a result, the model 118 of eyewear and the model 120 of the user's 102 face may be treated as a single virtual object. If the model 120 of the user's 102 face moves (e.g., rotates or turns), the model 118 of eyewear will move consistent with the movement of the model 120 of the user's 102 face.

Figure 2:
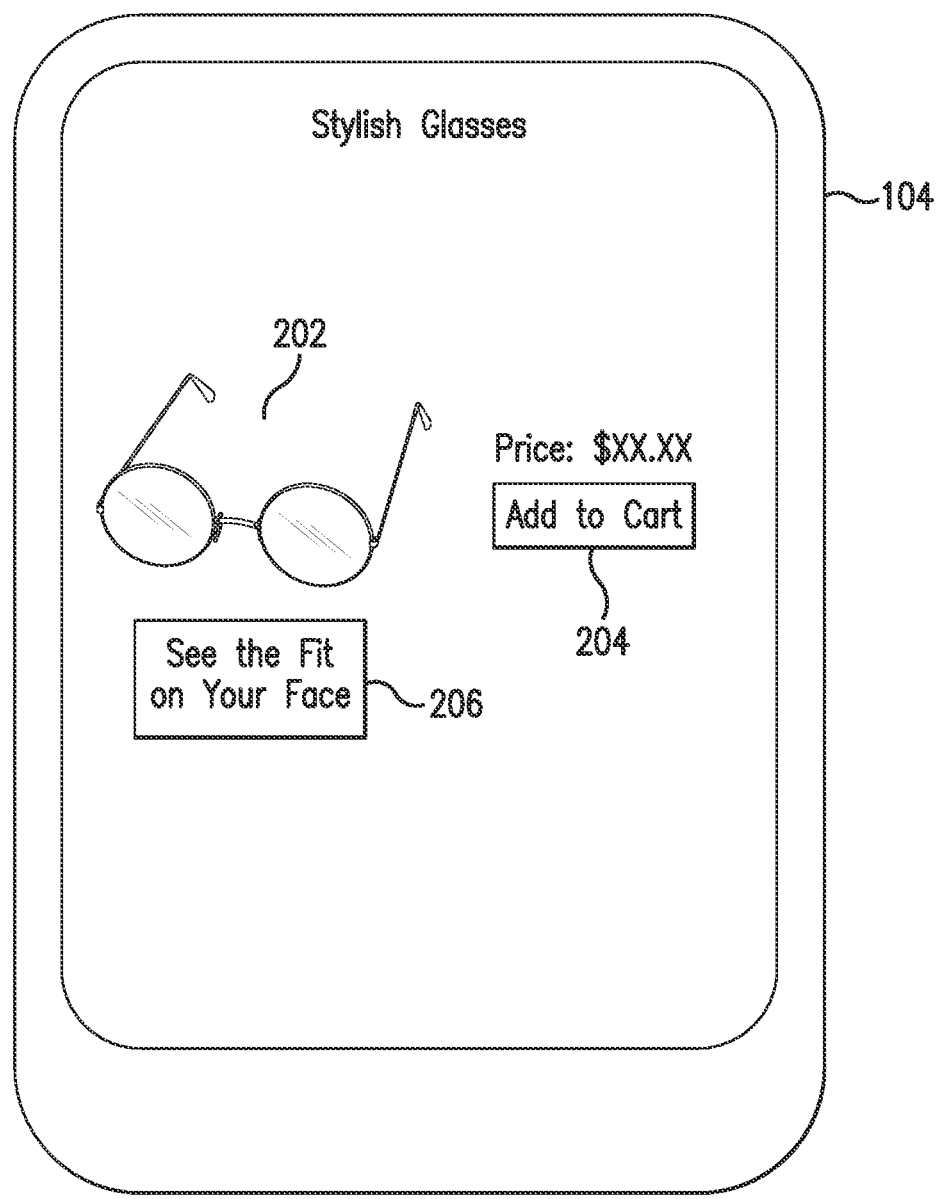
FIG. 2 illustrates an example device in the system of FIG. 1.

FIG. 2 illustrates an example device 104 in the system 100 of FIG. 1. As seen in FIG. 2, the device 104 is being used to peruse eyewear online. The device 104 is displaying an image of eyewear 202. The device 104 also displays a price for the eyewear 202, as well as an interactive element 204, and an interactive element 206. The interactive elements 204 and 206 may be buttons, links, swipe bars, or any other suitable virtual element with which the user 102 may interact. When the user 102 activates or interacts with the element 204 (e.g., by clicking on a button or link, swiping on a swipe bar, etc.), the device 104 causes the eyewear 202 to be added to the user's shopping cart, which then allows the user 102 to purchase the eyewear 202. When the user 102 activates or interacts with the element 206 (e.g., by clicking on a button or link, swiping on a swipe bar, etc.), the device 104 simulates a fit of the eyewear 202 on the face of the user 102.

Figure 3:
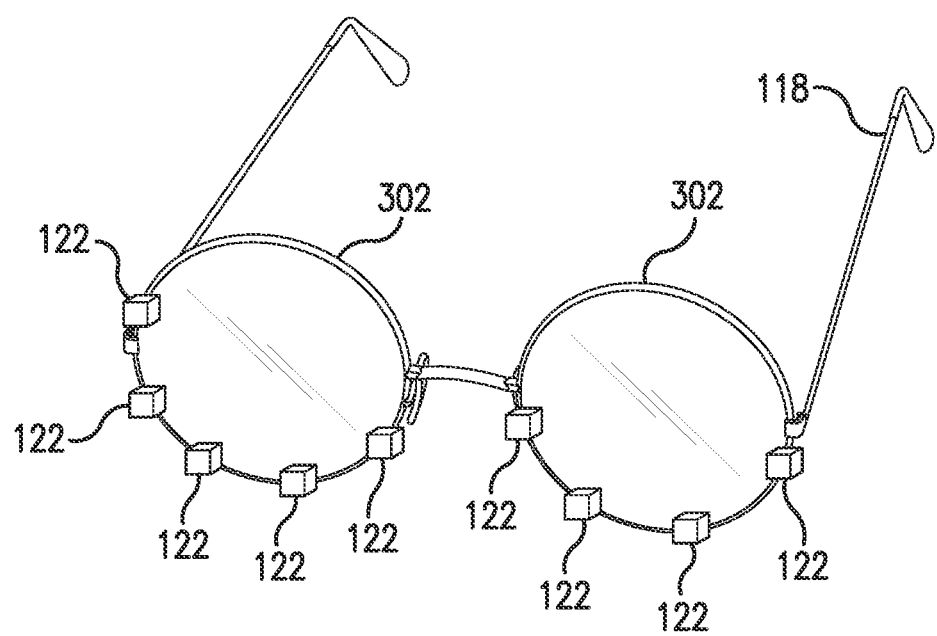
FIG. 3 illustrates an example model of eyewear in the system of FIG. 1.

FIG. 3 illustrates an example model 118 of eyewear in the system 100 of FIG. 1. The device 104 (shown in FIG. 1) may have retrieved the model 118 from the database 108 (shown in FIG. 1) in response to a user 102 indicating that the user 102 wants to simulate a fit of the eyewear on the face of the user 102 (e.g., by activating or interacting with the interactive element 206 shown in FIG. 2).

The model 118 may be a three-dimensional model of the eyewear that the user 102 was viewing on the device 104. The device 104 analyzes the model 118 of eyewear to detect the boundaries or borders of the eyewear. For example, the device 104 may detect the boundaries of the rims 302 of the eyewear. The device 104 then attaches one or more colliders 122 to portions of the boundary of the eyewear. As seen in FIG. 3, the device 104 attaches multiple colliders 122 along the boundaries of the rims 302 of the eyewear. As discussed previously, the colliders 122 are three-dimensional, virtual, kinematic objects (e.g., kinematic cubes) that are used to detect collisions with other colliders (e.g., colliders positioned on a model of the user's 102 face). For example, the colliders 122 may detect when a bottom portion of the rims 302 collide with a collider on the model of the user's 102 face.

Figure 4:
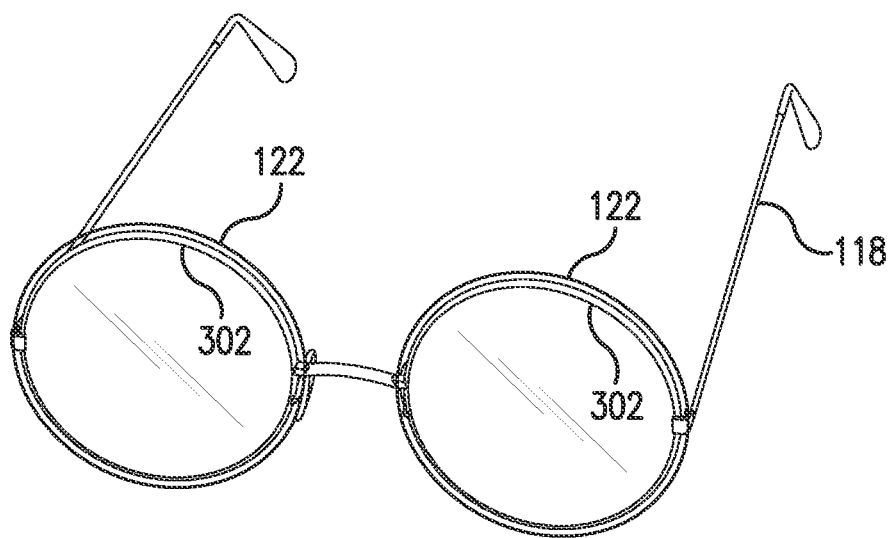
FIG. 4 illustrates an example model of eyewear in the system of FIG. 1.

FIG. 4 illustrates an example model 118 of eyewear in the system 100 of FIG. 1. As seen in FIG. 4, colliders 122 are attached to the model 118 of eyewear. The shape and size of the colliders 122 in the example of FIG. 4 differ from the sizes and shapes of the colliders 122 in the example of FIG. 3. In the example of FIG. 4, the colliders 122 are shaped and sized to conform to the shape and size of the rims 302 of the eyewear. As a result, the colliders 122 are positioned on the rims 302 and conform to the shape of the rims 302. The colliders 122 may thus detect when any portion of the rims 302 collide with a collider on the model of the user's 102 face. In some embodiments, the device 104 attaches only one collider 122 to the model 118 of eyewear. The collider 122 attaches and conforms to both rims 302 and the bridge connecting the rims 302.

Figure 5:
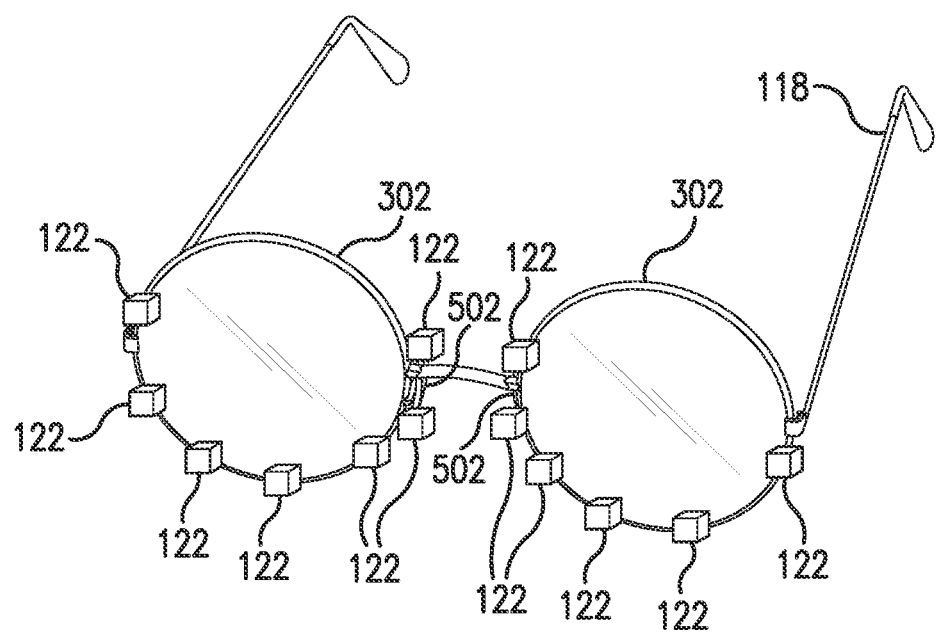
FIG. 5 illustrates an example model of eyewear in the system of FIG. 1.

FIG. 5 illustrates an example model 118 of eyewear in the system 100 of FIG. 1. The eyewear in the example of FIG. 5 differs from the eyewear shown in the examples of FIG. 3 and FIG. 4. Specifically, the eyewear in the example of FIG. 5 includes rims 302 and nose pads 502 coupled to the rims 302. The device 104 (shown in FIG. 1) attaches colliders 122 to portions of the boundary of the model 118 of eyewear. Specifically, the device 104 attaches colliders 122 to portions of the rims 302 and to portions of the nose pads 502. For example, the device 104 may attach colliders 122 to the pads of the nose pads 502 and to the pad arms of the nose pads 502. As a result, the device 104 may detect when collisions occur between portions of the rims 302 or the nose pads 502 and colliders positioned on a model of the user's 102 face.

The device 104 may attach any suitable number of colliders 122 to the model 118 of eyewear. These colliders 122 may be of any size or shape. For clarity, the number of colliders 122 shown in FIGS. 3-5 have been reduced and their sizes increased. Many more colliders 122 with reduced sizes may be attached to the model 118 of eyewear. For example, the device 104 may attach forty-five colliders to the model 118 of eyewear, with each collider 122 being a cube with sides that are two millimeters long. If the model 118 of eyewear includes nose pads 502, then the device 104 may attach twenty-five colliders 122 to the nose pads 502, with each collider 122 being a cube with sides that are one millimeter long. If the nose pads 502 have pad arms, then the device may attach five colliders 122 to the pad arms, with each collider 122 being a cube with sides that are one millimeter long. The size of the colliders 122 may be selected based on the desired precision of placement of the model 118 of eyewear on the model of the face. For example, increasing the size of the colliders 122 may cause the model 118 of the eyewear to rest further off the face. Decreasing the size of the colliders 122 may cause the model 118 of the eyewear to rest closer to the face.

Figure 6C:
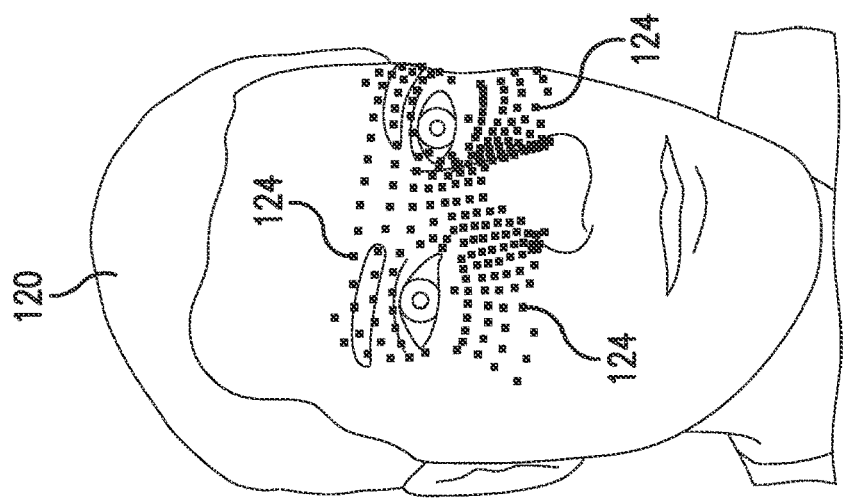
FIGS. 6A, 6B, and 6C illustrate an example model of a face in the system of FIG. 1.
Figure 6B:
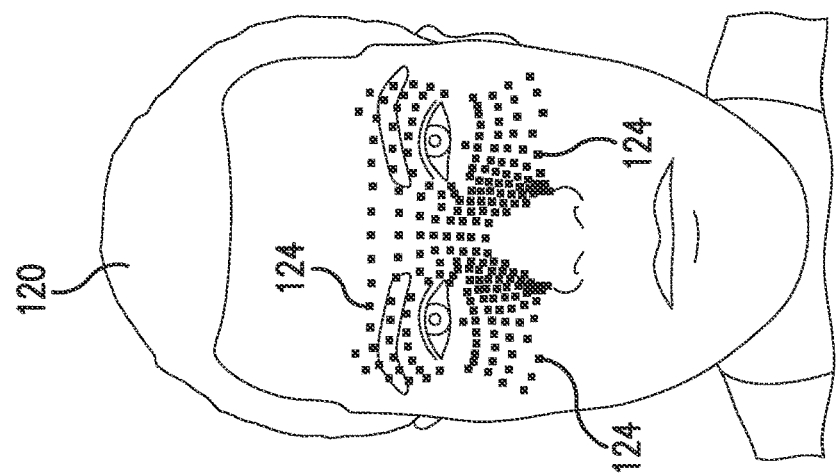
Figure 6A:
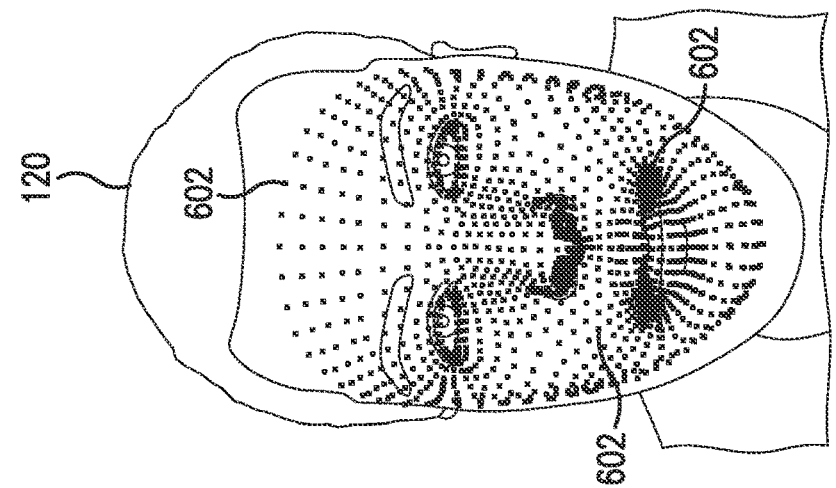

FIGS. 6A, 6B and 6C illustrate an example model 120 of a face in the system 100 of FIG. 1. As discussed previously, the device 104 (shown in FIG. 1) may generate the model 120 using images or video of a user's 102 face captured by a camera 114. In some embodiments, the model 120 is a mesh model with vertices that represent the contours and surfaces of the user's 102 face. FIG. 6A shows the model 120 with the vertices 602 of the mesh. The vertices 602 are positioned across the face at locations where the contour of the face changes. For example, the vertices 602 may be positioned on ridges or bumps on the surface of the face. For clarity, not all of the vertices 602 in FIG. 6A have been labeled.

In some embodiments, the device 104 applies rules or thresholds to the vertices 602 so that some of the vertices 602 are excluded when the device 104 attaches colliders 124 to the model 120 of the face. For example, the rules and thresholds may eliminate a percentage of the vertices 602 that are at the vertically highest or vertically lowest positions on the face (e.g., vertices with the highest and lowest vertical coordinates). Additionally, the rules or thresholds may eliminate the vertices 602 that are the furthest or the nearest along the depth of the face (e.g., vertices with the highest and lowest depth coordinates). Moreover, the rules or thresholds may eliminate the vertices 602 that are furthest to the left and right along the width of the face (e.g., vertices with the highest and lowest horizontal coordinates). As a result, the vertices 602 that are at the extremes of up to three orthogonal axes may be excluded or eliminated before the device 104 attaches colliders 124 to the model 120 of the face. In one example, the device 104 may exclude or eliminate 45% of the vertices 602 that are closest to the bottom of the face, and 40% of the vertices 602 that are closest to the top of the face. Additionally, the device 104 may eliminate 55% of the vertices 602 that are furthest along the depth of the face, and 17% of the vertices 602 that are nearest along the depth of the face. The device 104 may eliminate these vertices 602, because the eyewear will not contact these positions of the face when eyewear is resting on the face. In this manner, the device 104 reduces the number of vertices 602, which reduces the number of colliders 124 attached to the model 120 of the face. As a result, the device 104 reduces the amount of processing resources used and the time expended to detect collisions.

In some embodiments, the device 104 also excludes or eliminates vertices 602 that are positioned on or around the eyes of the model 120 of the face. The device 104 identifies the vertices 602 that are positioned on or around the left and right eyes of the model 120 of the face. The device 104 then eliminates or excludes these vertices 602 when attaching the colliders 124 to the model 120 of the face. The device 104 may eliminate these vertices 602, because the eyewear does not rest on or touch the eye when resting on a face.

FIG. 6B shows the model 120 of the face with colliders 124 attached to vertices 602 that were not excluded or eliminated by the device 104. As seen in FIG. 6B, the device 104 has excluded or eliminated vertices at the top (e.g., the forehead region) and bottom (e.g., the mouth and chin region) of the face. Additionally, the device 104 has eliminated vertices that are furthest (e.g., by the ears) or nearest (e.g., on the tip of the nose) along the depth of the face. The device 104 has also excluded or eliminated vertices on or around the eyes of the face. The device 104 attaches colliders 124 to the remaining vertices on the face. As seen in FIG. 6B, these colliders 124 are positioned on the face at locations that may contact eyewear, when the eyewear is resting on the face. For clarity, not all of the colliders 124 attached to the model 120 of the face are labeled in FIG. 6B.

FIG. 6C shows an isometric view of the model 120 of the face. As seen in FIG. 6C, the device 104 attaches colliders 124 to the remaining vertices in the model 120 of the face. The colliders 124 are positioned on the model 120 at locations where eyewear is likely to contact the face. For clarity, not all of the colliders 124 attached to the model 120 of the face are labeled in FIG. 6C.

In some embodiments, the device 104 uses the entire mesh of the model 602 as the collider 124. Similar to the example of the model 118 of eyewear in FIG. 4, the device 104 may attach one collider 124 to the mesh of the model 602 such that the collider 124 conforms to the shape of the face.

Figure 7B:
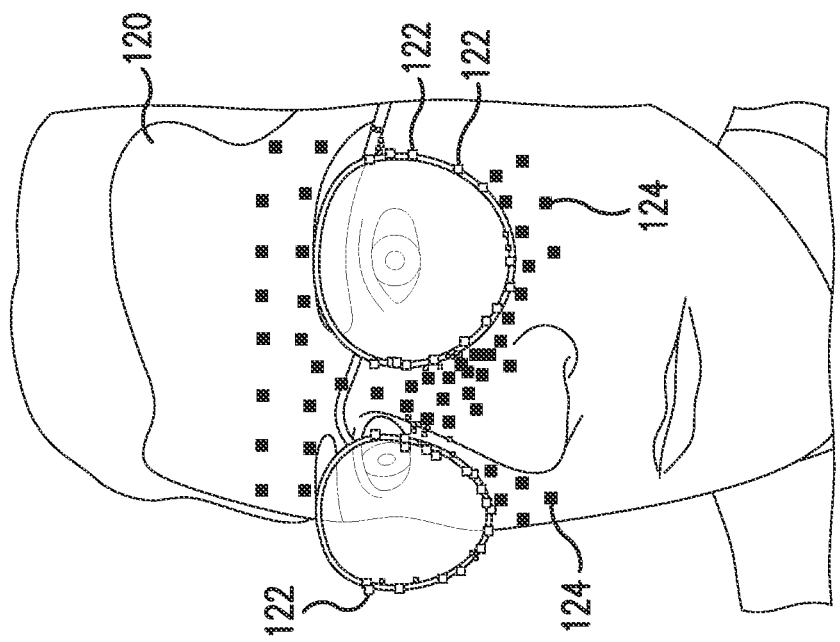
FIGS. 7A and 7B illustrate an example fit produced by the system of FIG. 1.
Figure 7A:
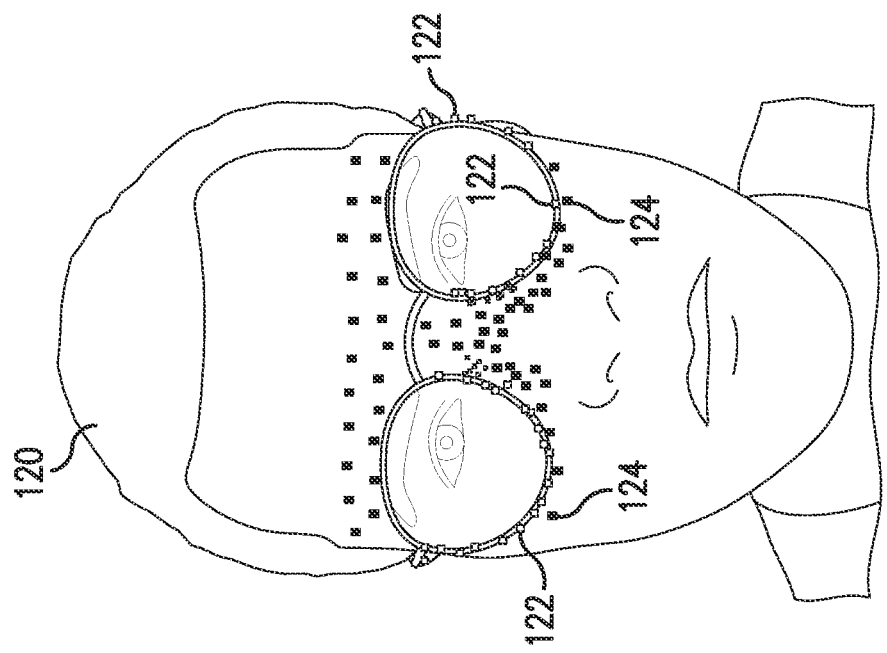

After the device 104 has attached colliders 122 to the model 118 of eyewear and colliders 124 to the model 120 of the face, the device 104 begins to simulate the fit of the eyewear on the face. The device 104 gradually moves the model 118 of eyewear towards the model 120 of the face until a collider 122 attached to the model 118 of eyewear collides with a collider 124 attached to the model 120 of the face. FIG. 7A and 7B show an example fit produced by the system 100 of FIG. 1.

FIG. 7A shows a frontal view of the fit and FIG. 7B shows an isometric view of the fit. As seen in FIGS. 7A and 7B, the model 118 of eyewear is positioned on the model 120 of the face. The colliders 122 attached to the model 118 of eyewear and the colliders 124 attached to the model 120 of the face are shown. The device 104 has gradually moved the model 118 of the eyewear towards the model 120 of the face in a three-dimensional virtual space until a collider 122 attached to the model 118 of the eyewear collides with a collider 124 attached to the model 120 of the face. For example, a collider 122 attached to the bottom of a rim of the eyewear may collide with a collider 124 attached to the cheek of the face. The device 104 then anchors the model 118 of the eyewear to the model 120 of the face so that the model 118 of eyewear and the model 120 of the face can be treated as a single virtual object. As a result, if the model 120 of the face turns or rotates, the model 118 of eyewear moves with the rotation or turning of the model 120 of the face, as seen in FIG. 7B. In particular embodiments, simulating the fit of eyewear on the face in this manner produces a more accurate and realistic depiction of the eyewear on the face relative to other techniques in which an image of the eyewear is merely superimposed onto an image of the face.

Figure 8:
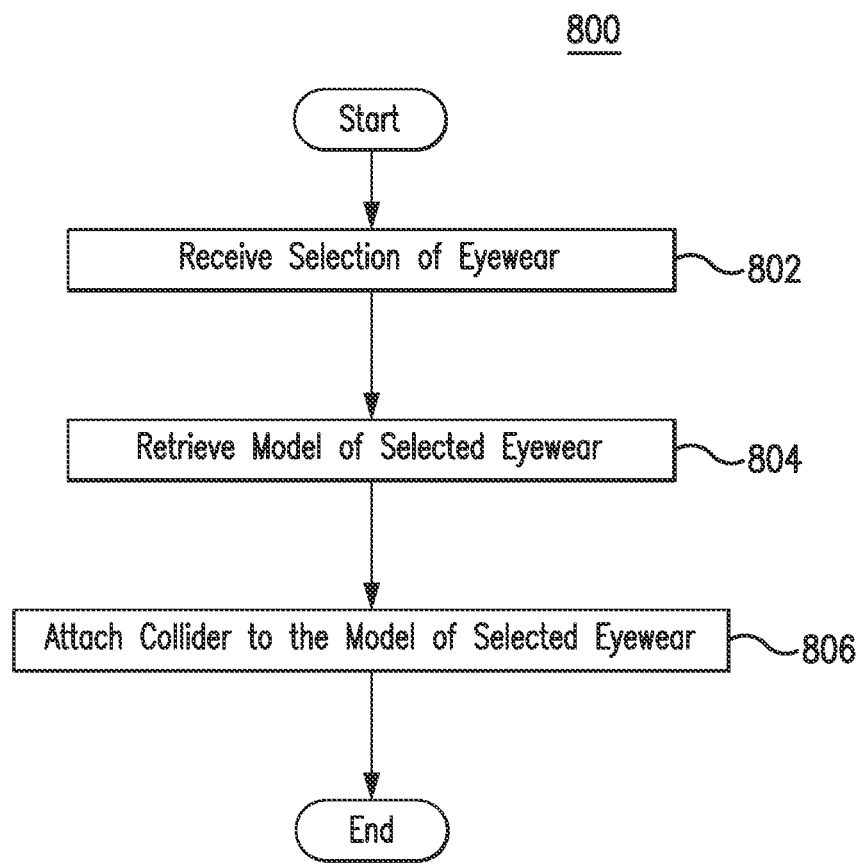
FIG. 8 is a flowchart of an example method performed by the system of FIG. 1.

FIG. 8 is a flowchart of an example method 800 performed by the system 100 of FIG. 1. In particular embodiments, the device 104 performs the method 800. By performing the method 800, the device 104 prepares a model 118 of eyewear for simulating a fit on a user's 102 face.

In block 802, the device 104 receives a selection of eyewear 202. The device 104 may receive this selection as a user 102 peruses eyewear on the device 104. The user 102 may see eyewear 202 that the user 102 desires to purchase. The user 102 may also interact or activate an element 206 (e.g., a button, link, swipe bar, etc.) on the device 104 that indicates a desire to simulate a fit of the eyewear 202 on the user's 102 face. The device 104 receives the selection of the eyewear 202 in response to the user 102 interacting or activating the element 206.

In block 804, the device 104 retrieves a model 118 of the selected eyewear 202, which may be a three-dimension model of the eyewear 202. The device 104 may retrieve the model 118 from a database 108 that stores multiple eyewear models 126. The device 104 queries the database 108 using a name or identifier for the eyewear 202. The database 108 then returns the model 118 of the eyewear 202.

In block 806, the device 104 attaches a collider 122 to the model 118 of the selected eyewear 202. The collider 122 may be a three-dimensional, virtual, kinematic object (e.g., a kinematic cube) that the device 104 uses to detect collisions with other colliders. The device 104 attaches the collider 122 to a portion of the boundary of the model 118 of eyewear. For example, the device 104 may attach the collider 122 onto a portion of a rim 302 of the model 118. As another example, the device 104 may attach the collider 122 to a nose pad 502 on the model 118. The device 104 may attach any suitable number of colliders 122 to any suitable portion of the model 118 of eyewear. For example, the device 104 may attach multiple colliders 122 along the bottom portion of the rims 302 of the model 118. Additionally, the device 104 may attach multiple colliders to the nose pads 502, including the pads and pad arms. The device 104 may then use these colliders 122 to detect when the model 118 of eyewear collides with the user's 102 face.

The colliders 122 may be any suitable size or shape. For example, the device 104 may attach colliders 122 that are virtual kinematic cubes. The device 104 may attach multiple of these cubes to portions of the boundary of the model 118 (e.g., to portions of the rim 302 or to the nose pads 502 of the eyewear). As another example, the device 104 may attach a collider 122 that is sized and shaped to conform to the rim 302 or rims 302 of the eyewear. By attaching this collider 122 to the rim 302 of the eyewear, the device 104 may detect when any portion of the rim 302 has collided with a collider attached to the face of the user 102.

Figure 9:
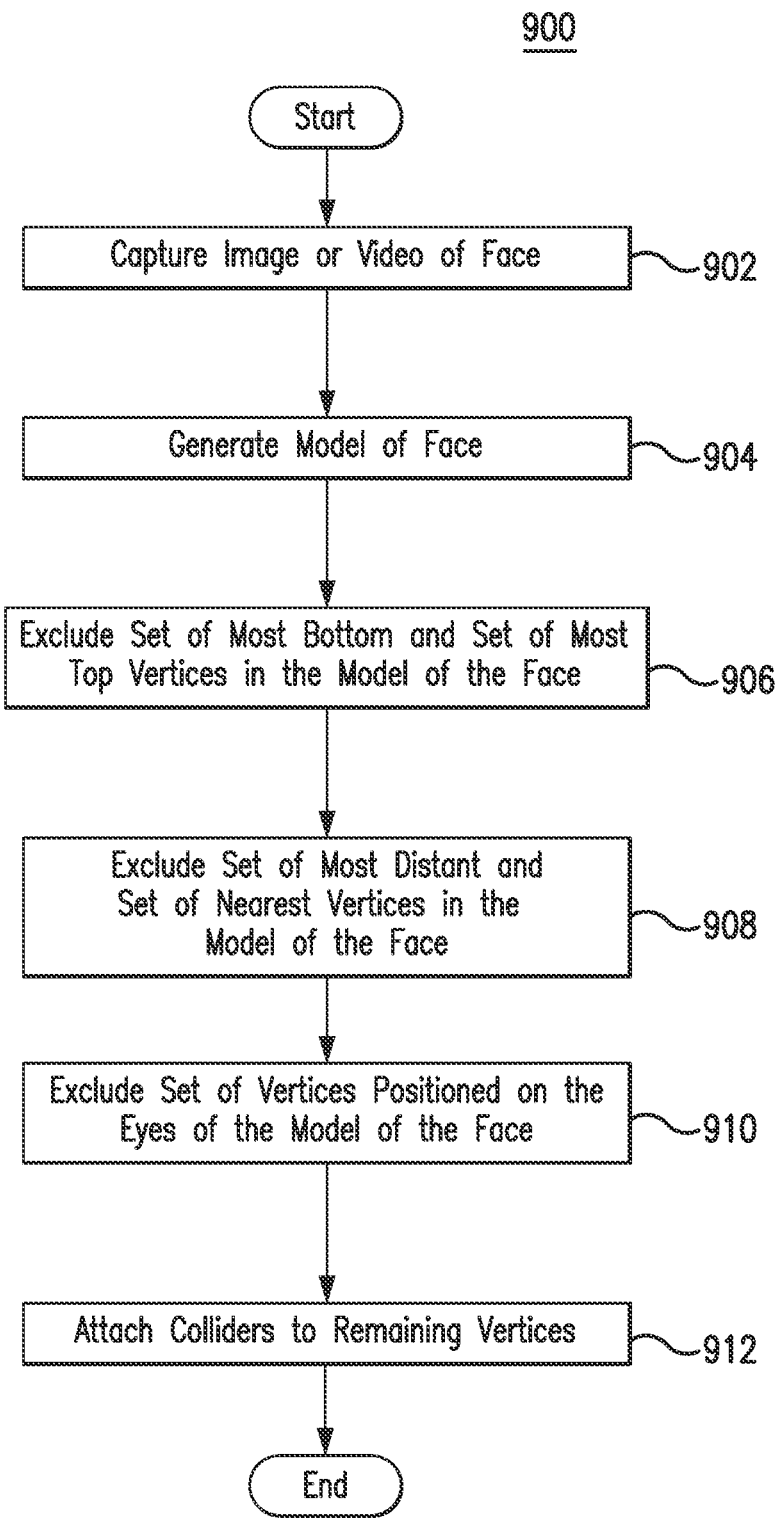
FIG. 9 is a flowchart of an example method performed by the system of FIG. 1.

FIG. 9 is a flowchart of an example method 900 performed by the system 100 of FIG. 1. In particular embodiments, the device 104 performs the method 900. By performing the method 900, the device 104 prepares a model 120 of the user's 102 face to simulate a fit of eyewear on the user's 102 face.

In block 902, the device 104 captures an image or a video of a face. For example, the device 104 may use a camera 114 on the device 104 to capture an image or video of the user's 102 face. In block 904, the device 104 generates a model 120 of the face using the captured image or video. The model 120 may be a three-dimensional mesh model with vertices positioned where the contours or surface of the face changes. For example, the vertices may be positioned on bumps or ridges on the surface of the face.

In block 906, the device 104 excludes a set of the most bottom and a set of the most top vertices in the model 120 of the face. The device 104 may identify a percentage of the vertices that are near the bottom of the face (e.g., a mouth and chin region) and a percentage of the vertices that are near the top of the face (e.g., a forehead region), and exclude these vertices. In some embodiments, the device 104 excludes 45% of the most bottom vertices, and 40% of the most top vertices in the mesh model 120 of the face.

In block 908, the device 104 excludes a set of the most distant and a set of the nearest vertices in the model 120 of the face. For example, the device 104 may exclude a percentage of the vertices that are most distant (e.g., near the ears) and a percentage of the vertices that are nearest (e.g., on the tip of the nose) along the depth of the model 120 of the face. In some embodiments, the device 104 excludes 55% of the most distant vertices and 17% of the nearest vertices in the mesh model 120 of the face. In this manner, the device 104 excludes the vertices that are at the extremes along two orthogonal axis of the mesh model, which may be the vertices that are least likely to contact eyewear when the eyewear is positioned on the face.

In block 910, the device 104 excludes a set of vertices positioned on the eyes of the model 120 of the face. The device 104 may identify the locations of the eyes of the mesh model 120. The device 104 then excludes the vertices positioned on or around the locations of the eyes of the model 120.

In block 912, the device 104 attaches colliders 124 to the remaining vertices in the mesh model 120 of the face. The remaining vertices may represent positions on the face that are most likely to contact eyewear when the eyewear is positioned on the face. By performing the method 900, the device 104 reduces the number of vertices in the mesh model to which colliders 124 are attached. As a result, the device 104 reduces the amount of processing resources and the amount of time it takes to simulate the fit of eyewear on the face.

In some embodiments, the device 104 attaches a collider 124 to the entire mesh of the model 120 of the face. The collider 124 attaches to the edges and vertices of the mesh such that the collider 124 conforms to the shape of the face.

Figure 10:
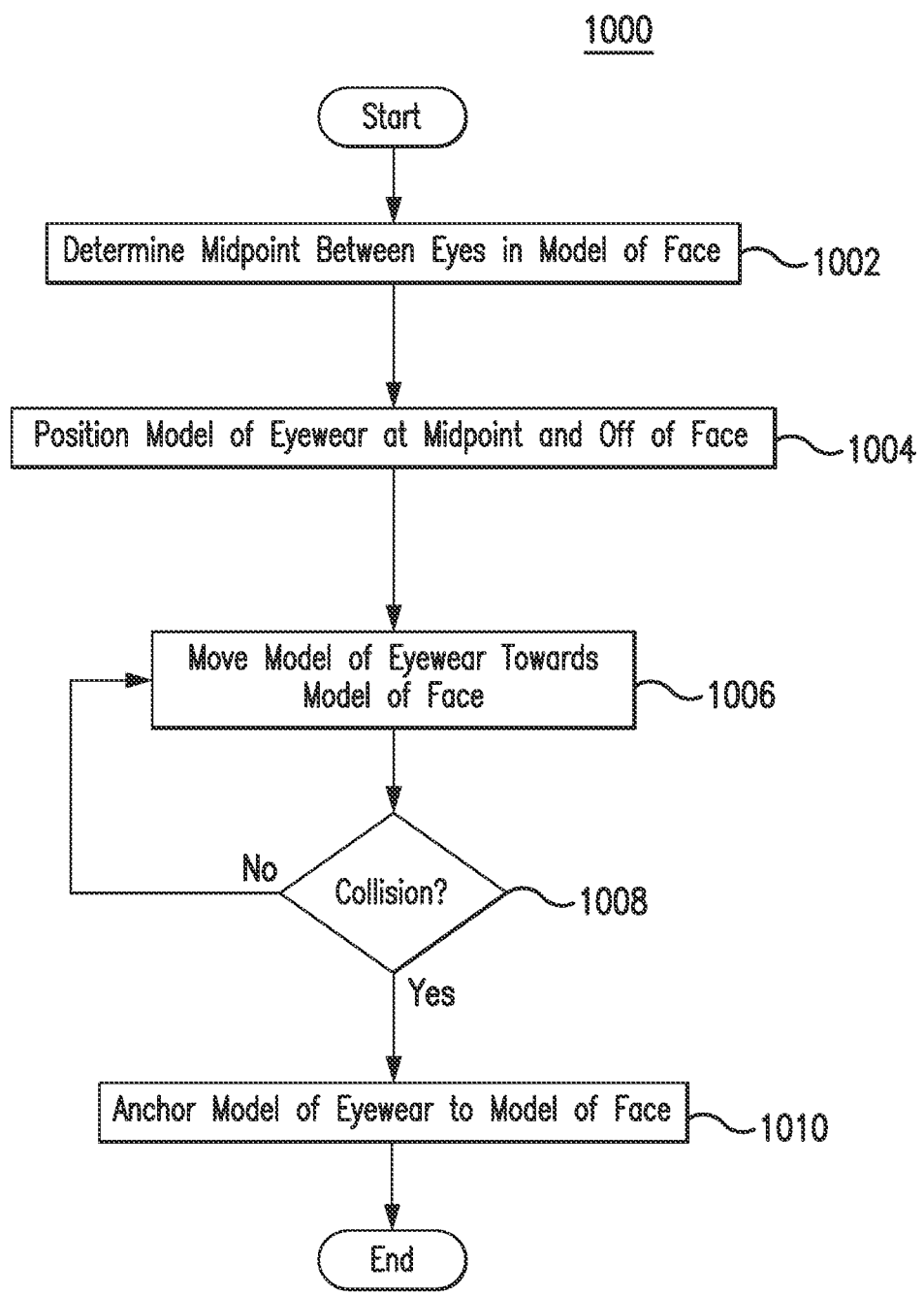
FIG. 10 is a flowchart of an example method performed by the system of FIG. 1.

FIG. 10 is a flowchart of an example method 1000 performed in the system of FIG. 1. In particular embodiments, the device 104 performs the method 1000. By performing the method 1000, the device 104 simulates the fit of eyewear on the face of a user 102.

In block 1002, the device 104 determines a midpoint between the eyes in the model 120 of the face. As discussed with respect to FIG. 9, the device 104 may identify the locations of the eyes in the mesh model 120 of the face. The device 104 may use these positions of the eyes to determine a midpoint between the eyes in the mesh model 120 of the face. In block 1004, the device 104 positions the model 118 of eyewear based on this identified midpoint so that the eyewear is initially positioned off the face but at a midpoint between the eyes of the face.

In block 1006, the device 104 begins moving the model 118 of eyewear towards the model 120 of the face. This movement may be gradual. For example, at each iteration of the block 1006, the device 104 may move the model 118 of eyewear from one millimeter to two millimeters towards the model 120 of the face. In block 1008, the device 104 checks whether a collider 122 on the model 118 of eyewear has collided with a collider 124 on the model 120 of the face (e.g., if the collider 122 and the collider 124 are within a millimeter of each other). If no collision is detected, the device 104 performs another iteration of block 1006 and moves the model 118 of eyewear closer to the model 120 of the face (e.g., by another one to two millimeters). This process continues until the device 104 detects a collision between the collider 122 on the model 118 of eyewear and a collider 124 on the model 120 of the face. This process of moving the model 118 of eyewear gradually towards the model 120 of the face may be transparent to the user 102 viewing the device 104. Stated differently, the device 104 may not display the movement of the model 118 of eyewear towards the model 120 of the face. Rather, the device may display the model 118 of eyewear on the model 120 of the face after the collision is detected and the model 118 of eyewear is anchored.

In embodiments where the collider 122 conforms to the shape of the model 118 of eyewear (e.g., the rims 302 of the model 118 of eyewear) or the collider 124 conforms to the shape of the model 120 of the face, the device 104 may still move the model 118 of eyewear towards the model 120 of the face until a collision is detected. For example, the device 104 may move the model 118 of eyewear towards the model 120 of the face until the collider 122 is within a certain distance of the collider 124 (e.g., within one millimeter). As another example, the device 104 may move the model 118 of eyewear towards the model 120 of the face until the triangles of the mesh of the face model (e.g., the triangles formed by the vertices and edges of the mesh) intersect or touch the model 118 of eyewear.

When the device 104 detects a collision, the device 104 anchors the model 118 of eyewear to the model 120 of the face in block 1010. By anchoring the model 118 of eyewear to the model 120 of the face, the device 104 begins treating the model 118 of eyewear and the model 120 of the face as a single virtual object. As a result, when the model 120 of the face moves or rotates, the model 118 of eyewear moves with the movement or rotation of the model 120 of the face. In this manner, the user 102 may examine the fit of the eyewear on the user's 102 face from different perspectives.

In summary, a system 100 uses a collision detection algorithm to simulate an accurate and realistic fit of eyewear on a user's 102 face, in particular embodiments. When a user 102 who is shopping for eyewear online selects a piece of eyewear 202 to try, the system 100 retrieves a model 118 of the eyewear. The user 102 then uses a camera 114 (e.g., a phone camera) to capture an image or video of the user's 102 face and to convert that image or video into a model 120 of the user's 102 face. The system 100 then attaches one or more colliders 122 and 124 to the model 118 of the eyewear and to the model 120 of the user's face. The colliders 122 and 124 are three-dimensional, virtual, kinematic objects (e.g., kinematic cubes) that can detect collisions with each other. The system 100 then gradually moves the model 118 of the eyewear towards the model 120 of the user's 102 face until a collider 122 on the model 118 of the eyewear collides with a collider 124 on the model 120 of the user's face. The system 100 then anchors the model 118 of the eyewear to the model 120 of the user's 102 face. In this manner, the system 100 simulates how the eyewear 202 will rest on the contours of the user's 102 face, in certain embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the application 116) or related data available in the cloud. For example, the application 116 could execute on a computing system in the cloud and to simulate a fit of eyewear on the user's 102 face.

While the foregoing is directed to embodiments of the present disclosure, other and further embodiments may be devised without departing from the basic scope thereof, and the scope thereof is determined by the claims that follow.

What is claimed is:

1. A method for fitting virtual eyewear onto a face, the method comprising:
receiving, from a database, a model of eyewear;
receiving, from a user device, a model of a user's face, wherein the model of the user's face comprises a mesh formed by a plurality of vertices;
attaching a first plurality of colliders to the model of eyewear;
attaching a second plurality of colliders to the model of the user's face, wherein the attaching the second plurality of colliders to the model of the user's face comprises:
determining a first percentage of vertices along a first dimension of the model of the user's face;
determining a first subset of the plurality of vertices by excluding the first percentage of vertices along the first dimension with respect to a first reference point on the mesh;
determining a second percentage of vertices along a second dimension of the model of the user's face;
determining a second subset of the plurality of vertices by excluding the second percentage of vertices along the second dimension with respect to a second reference point on the mesh; and
attaching a respective collider of the second plurality of colliders to each of the second subset of the plurality of vertices; and
positioning the model of eyewear onto the model of the user's face by reducing a distance between the model of eyewear and the model of the user's face until a first collider of the first plurality of colliders collides with a second collider of the second plurality of colliders; and
anchoring the model of eyewear to the model of the user's face.

2. The method of claim 1, wherein the first plurality of colliders are arranged on a first rim and a second rim of the model of eyewear.

3. The method of claim 1, wherein positioning the model of eyewear onto the model of the user's face comprises:
determining a midpoint between a first eye and a second eye of the model of the user's face;
determining an initial position of the model of eyewear based on the midpoint between the first eye and the second eye; and
incrementally moving the model of eyewear from the initial position towards the model of the user's face until the first collider collides with the second collider.

4. A method comprising:
attaching a first collider to a model of eyewear;
attaching a first plurality of colliders to a model of a user's face, wherein the first plurality of colliders comprises a second collider, wherein the model of the user's face comprises a mesh formed by a plurality of vertices and wherein the attaching the first plurality of colliders comprises:
determining a first percentage of vertices along a first dimension of the mesh;
determining a first subset of the plurality of vertices by excluding the first percentage of vertices along the first dimension with respect to a first reference point on the mesh;
determining a second percentage of vertices along a second dimension of the mesh;
determining a second subset of the plurality of vertices by excluding the second percentage of vertices along the second dimension with respect to a second reference point on the mesh; and
attaching a respective collider of the first plurality of colliders to each of the second subset of the plurality of vertices; and
positioning the model of eyewear onto the model of the user's face by reducing a distance between the model of eyewear and the model of the user's face until the first collider attached to the model of eyewear collides with the second collider attached to the model of the user's face; and
anchoring the model of eyewear to the model of the user's face.

5. The method of claim 4, further comprising attaching, to the model of eyewear, a first plurality of colliders comprising the first collider.

6. The method of claim 5, wherein the first plurality of colliders are arranged on a first rim and a second rim of the model of eyewear.

7. The method of claim 6, wherein the first plurality of colliders are further arranged on nose pads of the model of eyewear.

8. The method of claim 4, wherein attaching the first plurality of colliders further comprises determining a third subset of vertices of the plurality of vertices positioned on an eye of the model of the user's face, wherein the third subset of vertices are excluded from the second subset of vertices.

9. The method of claim 4, wherein attaching the first plurality of colliders further comprises determining a third subset of vertices of the plurality of vertices with the highest coordinates in a third dimension, wherein the third subset of vertices are excluded from the second subset of vertices.

10. The method of claim 4, wherein positioning the model of eyewear onto the model of the user's face comprises:
determining a midpoint between a first eye and a second eye of the model of the user's face;
determining an initial position of the model of eyewear based on the midpoint between the first eye and the second eye; and
incrementally moving the model of eyewear from the initial position towards the model of the user's face until the first collider attached to the model of eyewear collides with the second collider attached to the model of the user's face.

11. The method of claim 4, further comprising moving the model of eyewear according to movement of the model of the user's face after anchoring the model of eyewear to the model of the user's face.

12. The method of claim 4, wherein the first collider is a kinematic cube.

13. The method of claim 4, wherein the first collider is a three-dimensional kinematic object that conforms to the model of eyewear.

14. An apparatus comprising:
a memory; and
a hardware processor communicatively coupled to the memory, wherein the hardware processor is configured to:
attach a first collider to a model of eyewear;
attach a first plurality of colliders to a model of a user's face, wherein the first plurality of colliders comprises a second collider, wherein the model of the user's face comprises a mesh formed by a plurality of vertices and wherein to attach the first plurality of colliders the hardware process is configured to:
determine a first percentage of vertices along a first dimension of the mesh;
determine a first subset of the plurality of vertices by excluding the first percentage of vertices along the first dimension with respect to a first reference point on the mesh;
determine a second percentage of vertices along a second dimension of the mesh;
determine a second subset of the plurality of vertices by excluding the second percentage of vertices along the second dimension with respect to a second reference point on the mesh; and
attach a respective collider of the first plurality of colliders to each of the second subset of the plurality of vertices; and
position the model of eyewear onto the model of the user's face by reducing a distance between the model of eyewear and the model of the user's face until the first collider attached to the model of eyewear collides with the second collider attached to the model of the user's face; and
anchor the model of eyewear to the model of the user's face.

15. The apparatus of claim 14, wherein attaching the first plurality of colliders further comprises determining a third subset of vertices of the plurality of vertices positioned on an eye of the model of the user's face, wherein the third subset of vertices are excluded from the second subset of vertices.

16. The apparatus of claim 14, wherein positioning the model of eyewear onto the model of the user's face comprises:
determining a midpoint between a first eye and a second eye of the model of the user's face;
determining an initial position of the model of eyewear based on the midpoint between the first eye and the second eye; and
incrementally moving the model of eyewear from the initial position towards the model of the user's face until the first collider attached to the model of eyewear collides with the second collider attached to the model of the user's face.

17. The apparatus of claim 14, further comprising moving the model of eyewear according to movement of the model of the user's face after anchoring the model of eyewear to the model of the user's face.

* * * * *